Sept. 20, 1955 R. M. ROPP 2,718,283
WHEEL LOCK FOR MOTOR VEHICLES
Filed Jan. 10, 1955
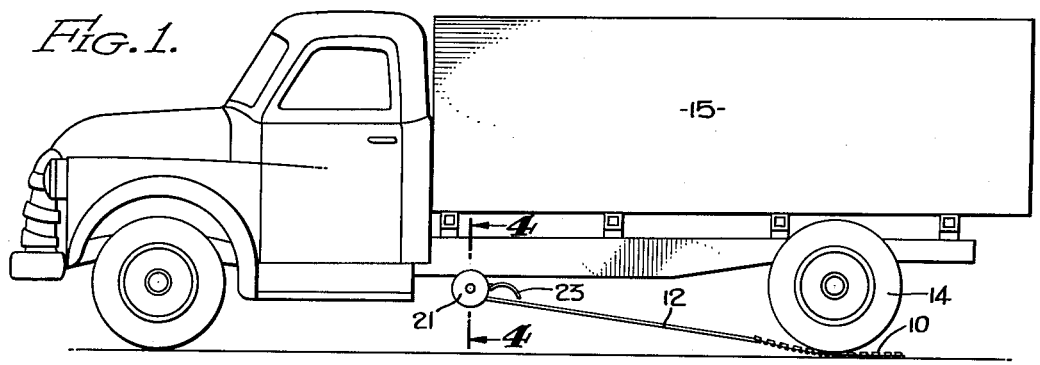
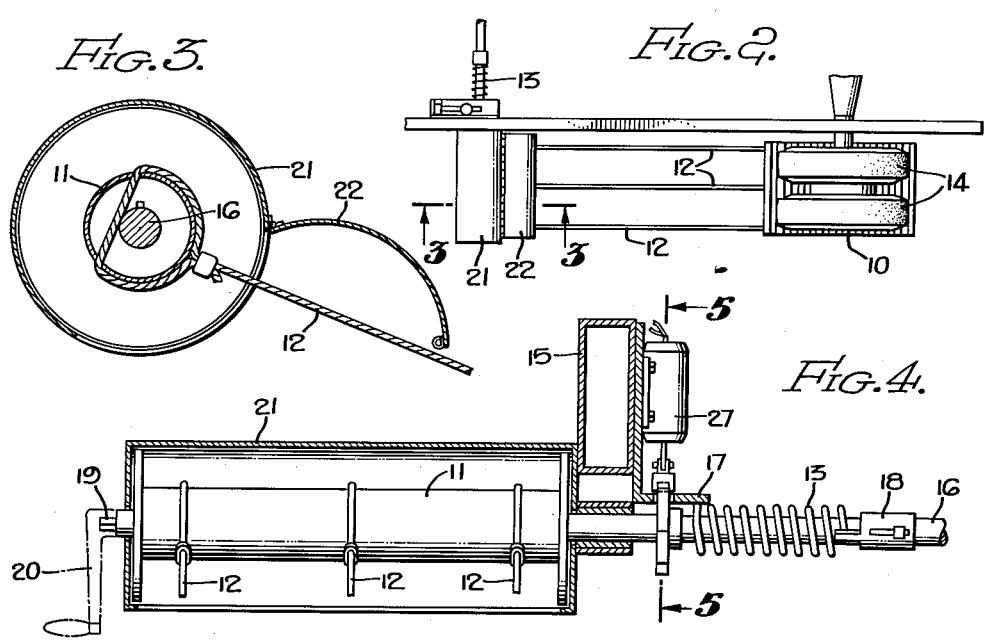
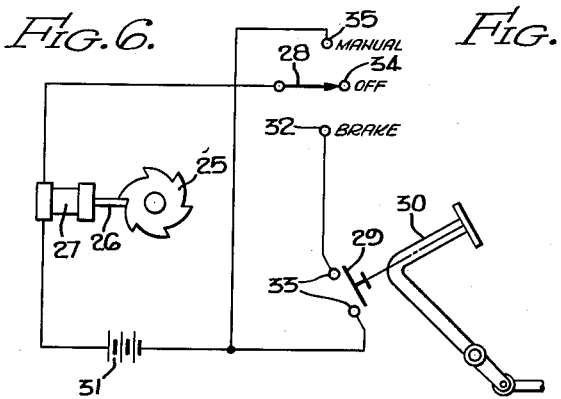
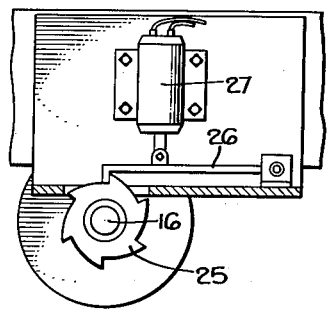
INVENTOR,
ROY M. ROPP
BY Stedman B Hoar
AGENT

2,718,283
WHEEL LOCK FOR MOTOR VEHICLES

Roy M. Ropp, Laguna Beach, Calif.

Application January 10, 1955, Serial No. 480,751

2 Claims. (Cl. 188—4)

This invention relates to means for locking the rear wheels of a motor vehicle to bring such a vehicle to a sudden stop in the event that the regular brake system is defective or inadequate. The invention also includes means for retracting the wheel-locking means after operation thereof to a position in which they will not impede the progress of the vehicle, and means for rendering the wheel-locking means inoperative so that in the event of defective brakes the vehicle may be driven cautiously to a repair station without constantly being stopped by locked wheels.

In its preferred form the invention includes skid-mats, normally wound upon drums or reels beneath the vehicle and capable of being rapidly unwound from the reels while still attached thereto, to take a position under the rear wheels of the vehicle. I am aware that such devices are known in the art, but they are generally operable quite independently of the regular brakes of the vehicle, and therefore require that the operator shift his foot from the brake-pedal or take some other action at an instant when his whole attention is concentrated on stopping in the normal manner. It is an object of the invention to provide a skid-mat operable in conjunction with the brakes when the latter fail to hold in response to normal depression of the brake pedal, by fractional movement of the brake pedal beyond its normal holding position.

The invention also includes an electrical switch which is under the control of the operator of the vehicle, by which the release mechanism is held inoperative to lower the skid-mat. The usual cause of brake-failure is leakage from the hydraulic control system, and of course such leakage, once disastrously effective, will continue until it is repaired. It is an object of the invention to give the operator warning of a dangerous condition of the brakes by bringing him to an abrupt halt upon the skid-mats, but then to permit him to proceed to a repair-shop at reduced speed and with care augmented by his knowledge of the faulty condition.

In the accompanying drawing, illustrative of a presently preferred embodiment of my invention, Fig. 1 is an elevational view showing a truck with the skid-mat of my invention released and in position beneath the rear wheels;

Fig. 2 is a partial top plan view showing one skid-mat and the releasing mechanism with reference to the left-hand rear wheels of the truck;

Fig. 3 is a much-enlarged sectional view on the line 3—3 of Fig. 2 of the reel on which the skid-mat is wound;

Fig. 4 is an enlarged transverse sectional view on the line 4—4 of Fig. 1;

Fig. 5 is a sectional view on the line 5—5 of Fig. 4 showing the engagement of the electric control with the ratchet wheel controlling the reel; and Fig. 6 is a diagrammatic illustration of a preferred wiring system.

Having reference now to the details of the drawing, I have shown in Fig. 1 a skid mat 10, adapted to be wound upon a reel 11 to which it is connected by cables 12. The reel 11 is ordinarily held under pressure of a spring 13, shown in Figs. 2 and 4, and when released by the hereinafter described mechanism it is urged by the spring 13 to unwind rapidly, throwing the skid-mad 10 to the ground and thence immediately under the rear wheels 14 of the vehicle 15. The skid-mat 10 is prevented from travelling beyond the position at which the wheels 14 run up on it by the cables 12, which are connected to the reel 11 as shown in Fig. 3. Throughout the illustration only the skid-mat adapted to go under the left rear wheels of the vehicle is shown; it will be understood that there are two such skid-mats 10, the one for the right rear wheels being wound by similar cables on a similar reel on the other end of the reel-shaft 16 (see Fig. 4). Only one spring 13 is required, having one end secured to any suitable stationary frame member such as at 17, and its other end placed under torque by a collar 18 secured to the reel shaft 16.

To enable the cables 12 and skid-mats 10 to be rewound on the reels 11, the reel-shaft 16 has a non-circular end 19 upon which a suitable crank 20 may be temporarily fitted when occasion requires. Also, to protect the skid-mats and cables from dust and mud, I prefer to house them, when not in use, in a cylindrical housing 21, having a downwardly opening door 22 provided with a suitable spring-catch 23. When the reel 11 is suddenly and violently unwound, the weight of the skid-mat, augmented by centrifugal force, will open the spring-catch 23 and permit the skid-mat to drop.

The rotation of the reel-shaft 16 is controlled by a ratchet 25, engageable so as to arrest rotation by a pawl 26 which is actuated by a solenoid 27, as shown in Fig. 5. The solenoid is contained in a circuit activated by switches at two positions, one a manual switch 28 which may be positioned on the instrument board or the steering post of the vehicle, and the other a contact switch 29, in a position to be closed by movement of the brake pedal 30 beyond the normal. Any suitable power source, such as the vehicle battery 31 may supply current to the circuit. Normally the switch 28 is placed in contact with the brake terminal 32, thus placing the solenoid 27 in a circuit which may be closed and actuated by the brake-pedal 30. Ordinary depression of the brake-pedal 30, sufficient to apply brakes which are in good condition, will not close the contact switch 29 upon its terminals 33. But should the braking system be out of order, permitting the brake-pedal 30 to depress beyond normal, the switch 29 will make a closed circuit, activating the solenoid 27, causing the pawl 26 to lift from the ratchet-wheel 25, and permitting the spring 13 to unwind the reel-shaft 16 and the skid-mats 10 and cables 12 wound upon the reels 11. The skid-mats 10 are then deposited under the wheels, stopping the vehicle.

After a stop effected by the skid-mats 10, should the vehicle operator desire to proceed to a repair station, he can back the vehicle from the skid-mats and rewind the cables 12 with skid-mats attached on the reels 11 by the crank 20. He will then move the switch 28 to the "off" position 34. With the switch 28 in this position, the switch 29 is ineffective to close the circuit to the solenoid 27, and the operator, being warned of his defective brakes, can proceed cautiously without running the risk of dropping the skid-mats under his wheels each time he wishes to slow down or to stop. An emergency stop in these circumstances, the operator being forewarned and prepared, can always be effected either by throwing the switch 28 to the "manual" position 35, which will instantly activate the solenoid 27, or by throwing the switch 28 to the brake terminal 32 and depressing the brake pedal. In effect the forewarned operator has a handbrake instantaneous in action, or a foot-brake which he may try tentatively with the reassurance that it will be ultimately effective.

The disclosed embodiment is not to be construed as a limitation upon the invention, the scope of which is deemed to include any desirable constructive modification within the spirit and breadth of the appended claims.

I claim:

1. In a vehicle having brakes, a member movable to a normally effective position for applying said brakes, and a source of electric power, the combination of: a mat, a reel on which said mat is wound, cables connecting said mat with said reel for winding said mat on said reel and permitting said mat to lie beneath wheels of said vehicle when unwound, a spring urging said reel to unwind, a ratchet wheel on said reel, a pawl engaging said ratchet wheel, a solenoid acting on said pawl to disengage said pawl from said ratchet wheel and to permit said spring to unwind said reel and said mat, parallel circuits both including said source of electric power and said solenoid, and two switches in said circuits, one of said switches being manually operated to complete one of said circuits in one position and in a second position to close the other of said circuits, the other switch lying in said other circuit and being closed to complete said other circuit by movement of said brake-applying member beyond said normally effective position.

2. In a vehicle having brakes, a member movable to a normally effective position for applying said brakes, and a source of electric power, the combination of: means separate from said brakes and applicable to the wheels of said vehicle for stopping rotation of said wheels, means for holding said first mentioned means out of contact with said wheels, electrically operated means for releasing said holding means to permit application of said first mentioned means to said wheels, a pair of parallel circuits both including said electrically operated means and said source of electric power, a manually operated switch for closing one of said circuits, and a switch closable by movement of said brake-applying member to a position beyond said normally effective position for closing said other circuit, said other circuit requiring for complete closure the movement of said manually operated switch to a position other than the position closing said one circuit.

No references cited.